United States Patent
Romem et al.

(10) Patent No.: US 10,976,932 B2
(45) Date of Patent: Apr. 13, 2021

(54) METHOD FOR PROVIDING A CLIENT DEVICE ACCESS TO A PLURALITY OF REMOTE STORAGE DEVICES

(71) Applicant: EXCELERO STORAGE LTD., Tel Aviv (IL)

(72) Inventors: Yaniv Romem, Jerusalem (IL); Omri Mann, Jerusalem (IL); Ofer Oshri, Kfar Saba (IL)

(73) Assignee: EXCELERO STORAGE LTD., Tel Aviv (IL)

(*) Notice: Subject to any disclaimer, the term of this patent is extended or adjusted under 35 U.S.C. 154(b) by 245 days.

(21) Appl. No.: 14/724,971

(22) Filed: May 29, 2015

(65) Prior Publication Data
US 2016/0036913 A1    Feb. 4, 2016

Related U.S. Application Data (60) Provisional application No. 62/126,920, filed on Mar. 2, 2015, provisional application No. 62/119,412, filed (Continued)

(51) Int. Cl.
  *G06F 3/06*       (2006.01)
  *H04L 12/64*      (2006.01)
  *G06F 15/167*     (2006.01)
  *H04L 29/08*      (2006.01)
  (Continued)

(52) U.S. Cl.
  CPC .......... *G06F 3/0611* (2013.01); *G06F 3/0604* (2013.01); *G06F 3/064* (2013.01); *G06F 3/065* (2013.01); *G06F 3/067* (2013.01); *G06F 3/0637* (2013.01); *G06F 3/0647* (2013.01); *G06F 3/0652* (2013.01); *G06F 3/0659* (2013.01); *G06F 3/0688* (2013.01); (Continued)

(58) Field of Classification Search
  CPC ............... H04L 29/08072; H04L 29/06; H04L 29/0809; H04L 29/08117; H04L 12/06; H04L 12/64; H04L 12/6418; H04L 29/08; H04L 67/00; H04L 67/1097; G06Q 30/02; G06F 11/1456; G06F 11/2074; G06F 11/2071; G06F 11/1451; G06F 11/2082; G06F 12/1081; G06F 13/00; G06F 15/167; G06F 15/173; G06F 15/17331; G06F 2212/65
  USPC .......................................... 709/219; 711/162
  See application file for complete search history.

(56) References Cited

U.S. PATENT DOCUMENTS

5,717,691 A    2/1998  Dighe et al.
6,839,803 B1   1/2005  Loh et al.
(Continued)

*Primary Examiner* — Robert B Harrell
(74) *Attorney, Agent, or Firm* — M&B IP Analysts, LLC (57) ABSTRACT

A controller system allows direct access to a client device accessing remote data storage devices communicatively connected to the controller. A virtual block metadata (VBM) is generated by the controller system, the VBM including a plurality of maps. Each map includes a plurality of virtual addresses, each virtual address mapped to a physical address, each physical address on a remote storage device of the plurality of storage devices. The client device is sent a portion of the VBM, the portion including the map of the virtual addresses sent to the client. The controller receives, over a first network interface, read/write instructions from the client device for the a physical address corresponding to the virtual address allocated to the client device.

27 Claims, 4 Drawing Sheets

Related U.S. Application Data on Feb. 23, 2015, provisional application No. 62/096,908, filed on Dec. 26, 2014, provisional application No. 62/085,568, filed on Nov. 30, 2014, provisional application No. 62/030,700, filed on Jul. 30, 2014.

(51) Int. Cl.
*G06F 15/173* (2006.01)
*G06F 12/1081* (2016.01)
*H04L 12/06* (2006.01)

(52) U.S. Cl.
CPC ........ *G06F 3/0689* (2013.01); *G06F 12/1081* (2013.01); *G06F 15/167* (2013.01); *G06F 15/17331* (2013.01); *H04L 12/06* (2013.01); *H04L 12/6418* (2013.01); *H04L 67/1097* (2013.01); *G06F 2212/65* (2013.01)

(56) References Cited

U.S. PATENT DOCUMENTS

| | | |
|---|---|---|
| 7,515,612 B1 | 4/2009 | Thompson |
| 7,539,780 B2 | 5/2009 | Makhervaks et al. |
| 7,577,667 B2 | 8/2009 | Hinshaw et al. |
| 7,590,768 B2 | 9/2009 | Gormley |
| 7,710,968 B2 | 5/2010 | Cornett et al. |
| 8,037,154 B2 | 10/2011 | Biran et al. |
| 8,103,785 B2 | 1/2012 | Crowley et al. |
| 8,122,155 B1 | 2/2012 | Marti |
| 8,233,380 B2 | 7/2012 | Subramanian et al. |
| 8,265,095 B2 | 9/2012 | Fritz et al. |
| 8,407,448 B1 * | 3/2013 | Hayden ............... G06F 9/45533 711/162 |
| 8,433,848 B1 | 4/2013 | Naamad et al. |
| 8,706,962 B2 | 4/2014 | Belluomini et al. |
| 8,775,718 B2 | 7/2014 | Kanevsky et al. |
| 8,832,216 B2 | 9/2014 | Bugge |
| 9,241,044 B2 | 1/2016 | Shribman et al. |
| 9,462,308 B2 | 10/2016 | LaBosco et al. |
| 2005/0129039 A1 | 6/2005 | Biran et al. |
| 2012/0144233 A1 | 6/2012 | Griffith et al. |
| 2013/0198311 A1 | 8/2013 | Tamir et al. |
| 2013/0198312 A1 | 8/2013 | Tamir et al. |
| 2014/0089444 A1 | 3/2014 | Makhervaks et al. |
| 2014/0297982 A1 | 10/2014 | Duzett |
| 2015/0026286 A1 | 1/2015 | Sharp et al. |
| 2015/0089121 A1 | 3/2015 | Coudhury et al. |

* cited by examiner

METHOD FOR PROVIDING A CLIENT DEVICE ACCESS TO A PLURALITY OF REMOTE STORAGE DEVICES

CROSS-REFERENCE TO RELATED APPLICATIONS

This Application claims priority to U.S. provisional Application No. 62/126,920 filed on Mar. 2, 2015, 62/119,412 filed on Feb. 23, 2015, 62/096,908 filed on Dec. 26, 2014, 62/085,568 filed on Nov. 30, 2014, and 62/030,700 filed on Jul. 30, 2014, the entire disclosures of which are incorporated herein by reference for all purposes.

BACKGROUND

Field

The disclosure generally relates to accessing a remote storage and particularly to accessing a remote storage by sending commands over a remote direct memory access.

Description of Related Art

Data storage is widely available in on-demand services. This allows clients to pay for as much or as little storage as they require. Data storage in a cloud environment further provides access to data whenever and wherever a user of a client device demands. Typically, a plurality of storage devices is communicatively coupled to a controller system, which allocates logical data blocks to requesting clients. The price for the accessibility of the data through any device is a high latency and low throughput. High latency and low throughput are caused by adding a network between the client device and the physical storage which the client device is accessing.

It would therefore be advantageous to provide a solution which allowed for low latency and high throughput delivery of data from a controller system to a client device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

Exemplary embodiments overcome the above disadvantages and other disadvantages not described above. Also, an exemplary embodiment is not required to overcome the disadvantages described above, and an exemplary embodiment of the present inventive concept may not overcome any of the problems described above.

One or more exemplary embodiments provide a computerized method for providing a client device, which is communicatively connected to a controller, access to a plurality of remote storage devices communicatively connected to the controller and to the client device, the method including: receiving from the client device, by the controller, a request for storage block mapping; and sending a map to the client device, the map including a plurality of virtual addresses, each virtual address corresponding to a physical address of a data block on a storage device of the plurality of remote storage devices.

The computerized method may further include receiving storage instructions from the client device over a remote direct memory access (RDMA) interface.

The map may further includes a version number.

The computerized method may further include receiving from the client device, by the controller, a second request for storage block mapping, the second request including a version number of the map; comparing the received version number of the map to a version number of a controller map; and sending an updated map to the client device, the updated map including a plurality of new virtual addresses, each new virtual address corresponding to a physical address of a data block on a storage device of the plurality of remote storage devices.

The computerized method may further include comparing the received version number of the map to a version number of a controller map; and initializing, in response to the received version number of the map and the version number of the controller map not matching, a process to make the received version number and the version number of the controller map match.

At least an address of the plurality of virtual addresses may correspond to a second plurality of virtual addresses.

At least a first physical address may be on a first storage device of the plurality of remote storage devices, and at least a second physical address may be on a second storage device of the plurality of remote storage devices.

The client device may be configured to directly access the data block by mapping the virtual address to the physical address of the data block.

According to an aspect of an exemplary embodiment, there is provided a controller communicatively coupled to a plurality of remote storage devices and providing a client device access to the remote storage devices, the controller including: a processing unit; a first network interface configured to communicate with the client device; a second interface configured to communicate with the plurality of remote storage devices; and a memory containing first instructions and communicatively coupled to the processing unit, wherein in response to the processing unit executing the first instructions, the controller is configured to: receive a request for storage block mapping from the client device; and send a map to the client device, wherein the map includes a plurality of virtual addresses, each virtual address corresponding to a physical address of a data block on a storage device of the plurality of remote storage devices.

The memory may further include second instructions, and in response to the second instructions being executed by the processing unit, the controller is further configured to: receive read/write instructions from the client device over a remote direct memory access (RDMA) interface.

The map may further include a version number.

The memory may further include third instructions, and in response to the third instructions being executed by the processing unit, the controller may be further configured to: receive a second request for storage block mapping from the client, the second request including a version number of the map; compare the received version number of the map to a version number of a controller map; and send an updated map to the client device, the updated map including a plurality of new virtual addresses, each new virtual address corresponding to a physical address of a data block on a storage device of the plurality of remote storage devices.

At least an address of the plurality of virtual addresses may correspond to a second plurality of virtual addresses.

At least a first physical address may be on a first storage device of the plurality of remote storage devices, and at least a second physical address may be on a second storage device of the plurality of remote storage devices.

The client device may be configured to directly access the data block by mapping the virtual address to the physical address of the data block.

According to an aspect of another exemplary embodiment, there is provided a computerized method for providing a client device, which is communicatively connected to a controller, access to a plurality of remote storage devices communicatively connected to the controller and to the client device, the method including: sending from the client device, to the controller, a request for storage block mapping; receiving a map from the controller, the map including a plurality of virtual addresses, each virtual address corresponding to a physical address of a data block on a storage device of the plurality of remote storage devices; and directly accessing, using the client device, the data block by mapping the virtual address to the physical address of the data block.

The computerized method may further include sending read/write instructions from the client device over a remote direct memory access (RDMA) interface.

The map may further include a version number.

The computerized method may further include sending from the client device, to the controller, a second request for storage block mapping, the second request including a version number of the map; receiving an updated map from the controller, the updated map including a plurality of new virtual addresses, each new virtual address corresponding to a physical address of a data block on a storage device of the plurality of remote storage devices.

At least an address of the plurality of virtual addresses may correspond to a second plurality of virtual addresses.

At least a first physical address may be on a first storage device of the plurality of remote storage devices, and at least a second physical address may be on a second storage device of the plurality of remote storage devices.

According to an aspect of another exemplary embodiment, there is provided a client device configured to access a plurality of remote storage devices through a controller, the plurality of remote storage devices communicatively coupled to the controller, the client device including: a processing unit; a first network interface for communicating with the controller; a second interface for communicating with a plurality of remote storage devices; and a memory communicatively coupled to the processing unit and containing first instructions, in response to the first instructions being executed by the processing unit, the client device is configured to: send a request for storage block mapping to the controller; and receive a map from the controller, the map including a plurality of virtual addresses, each virtual address corresponding to a physical address of a data block on a storage device of the plurality of remote storage devices, and wherein the client device is configured to directly access the data block by mapping the virtual address to the physical address of the data block.

The memory may further contain second instructions, in response to the second instructions being executed by the processing unit, the client device is further configured to send read/write instructions to the controller over a remote direct memory access (RDMA) interface.

The map may further include a version number.

The memory may further contain third instructions, in response to the third instructions being executed by the processing unit, the client device is further configured to: send a second request for storage block mapping to the controller, the second request including a version number of the map; and receive an updated map from the controller, the updated map including a plurality of new virtual addresses, each new virtual address corresponding to a physical address of a data block on a storage device of the plurality of remote storage devices.

At least an address of the plurality of virtual addresses may correspond to a second plurality of virtual addresses.

At least a first physical address may be on a first storage device of the plurality of remote storage devices, and at least a second physical address may be on a second storage device of the plurality of remote storage devices.

Other features and aspects will be apparent from the following detailed description, the drawings, and the claims.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION

Below, exemplary embodiments will be described in detail with reference to accompanying drawings so as to be easily realized by a person having ordinary skill in the art. The exemplary embodiments may be embodied in various forms without being limited to the exemplary embodiments set forth herein. Descriptions of well-known parts are omitted for clarity, and like reference numerals refer to like elements throughout.

The exemplary embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

Figure 1:
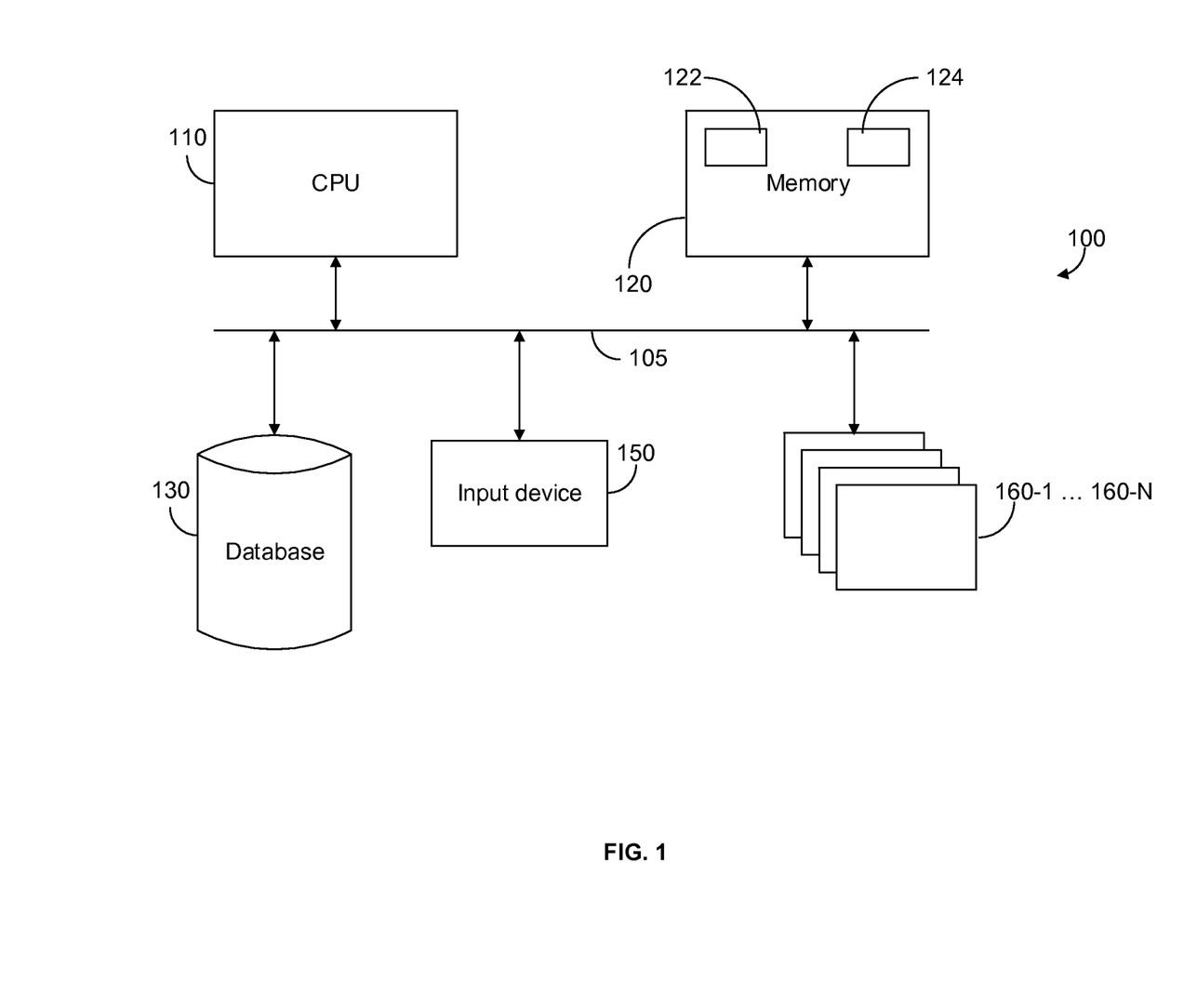
FIG. 1 is an exemplary controller system for providing a client device access to a plurality of remote storage devices.

FIG. 1 is an exemplary and non-limiting schematic illustration of a controller system 100. The controller system 100 may be used for metadata caching in a client accessing remote storage devices and is implemented according to an exemplary embodiment. The controller system 100 includes a processing element 110, for example, a central processing unit (CPU). Of course the controller system 100 may include a plurality of processing elements and in some exemplary embodiments, the processing element 110 is a plurality of processors. The CPU is coupled to a memory 120 via a bus 105. The memory 120 further includes a memory portion 122 that contains instructions. In response to the instructions included in the memory portion 122 being executed by the processing element 110, the processing element 110 performs the method described in more detail herein. The memory 120 may be further used as a working scratch pad for the processing element 110, a temporary storage, and the like. The memory 120 may include of volatile memory such as, but not limited to, random access memory (RAM), or non-volatile memory (NVM), such as, but not limited to, Flash memory. The memory 120 may further include a memory portion 124 containing virtual block metadata (VBM). The VBM includes a map of virtual addresses to physical addresses, the physical addresses being on one or more remote storage devices. In one exemplary embodiment, the VBM may be implemented as a write-once tree data structure. The processing element 110 may be coupled to an input device 150. The processing element 110 may be further coupled with a database 130. The database 130 may be used for the purpose of holding a copy of the method executed in accordance with the disclosed technique. The processing element 110 may be further coupled with a plurality of remote storage devices 160-1 through 160-N. If the remote storage devices 160-1 through 160-N are not distinguished from one another, they are simply referred to as the "remote storage device 160" individually or the "remote storage devices 160" collectively. Each of the remote storage devices 160 includes a plurality of physical storage blocks. In this exemplary embodiment the storage devices 160-1 through 160-N are coupled with the controller via the bus 105. It should be appreciated that in some embodiments some, or all of the storage devices 160 are communicatively coupled with the controller system 100 via a communication interface (not shown). The communication interface may provide connectivity of various sorts, for example, enabling connection to a network.

Figure 2:
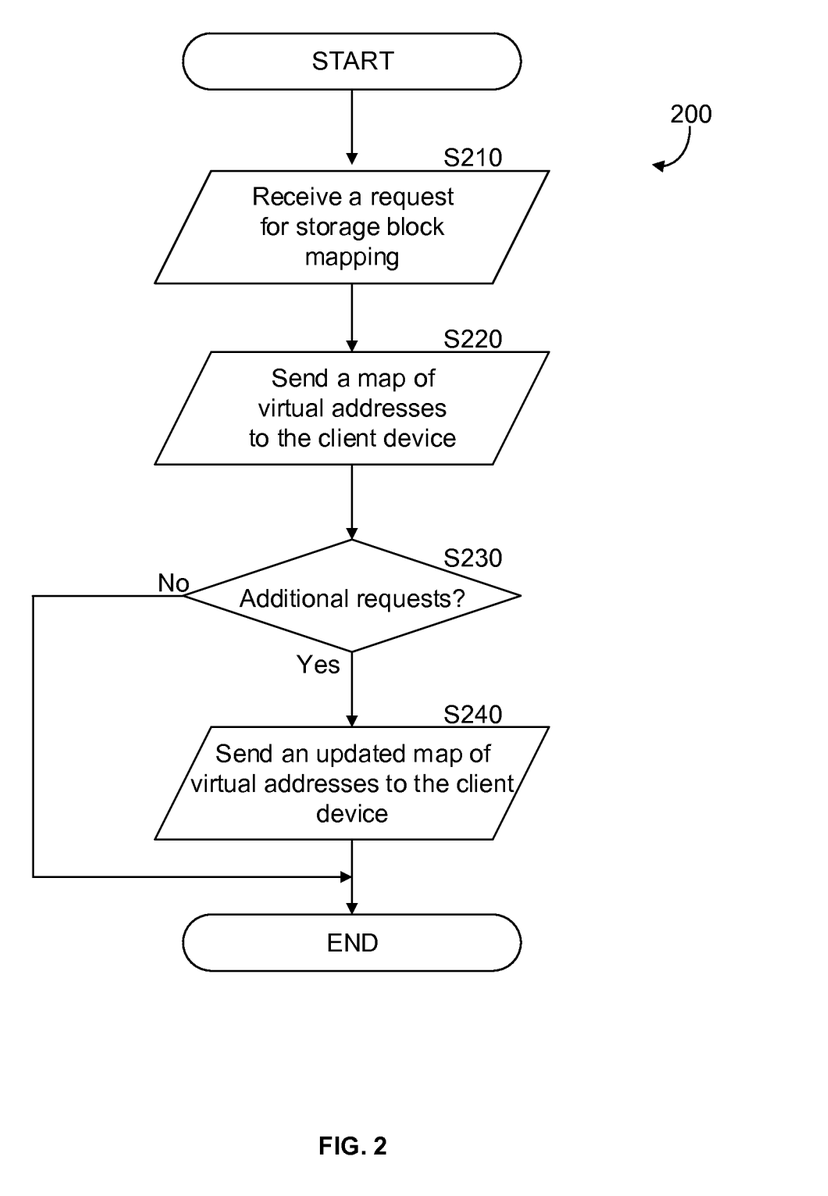
FIG. 2 is a flowchart of an exemplary method for providing a client device access to a plurality of remote storage devices.

FIG. 2 is a non-limiting exemplary flowchart 200 of a method for providing a client device access to a plurality of remote storage devices implemented according to an exemplary embodiment. In S210 a controller, such as controller system 100, receives a request for storage block mapping from a client device. The controller is communicatively connected to a plurality of remote storage devices 160. In another embodiment, the controller may be coupled with all, or a portion of, the plurality of remote storage devices. A remote storage device 160 may be a solid state drive (SSD), a hard disk drive (HDD), or a hybrid storage drive (HSD). A hybrid storage drive includes a first storage portion and a second storage portion. The first storage portion has a faster access speed than the second storage portion. Each remote storage device 160 includes a plurality of physical storage blocks. In S220 a map is sent to the client device. The map includes a plurality of virtual addresses. Each virtual address respectively corresponds to a physical address of a data block on a storage device of the plurality of remote storage devices 160. The client device is configured to directly access the data block by mapping the virtual address to the physical address of the data block. In certain exemplary embodiments, the map may further contain a version number. In some exemplary embodiments, the map may contain a version number for each address. In some exemplary embodiments, the map version number is compared to a corresponding client version number stored on the controller. In S230 a check is performed to determine if the client device has requested additional storage blocks. If the client device has requested additional storage blocks (yes), then the execution continues at S240. If the client device has not requested additional storage blocks (no), then the execution ends. In S240 an updated map is sent to the client. The updated map includes a plurality of additional virtual addresses. Each additional virtual address respectively corresponds to an additional physical address of a data block on a storage device of the plurality of remote storage devices 160.

The controller 100 may generate a virtual block metadata (VBM), which includes a plurality of maps. Each map of the plurality of maps corresponds to a client device accessing one or more storage devices of a controller. In some exemplary embodiments, a virtual address in a map may point to a second plurality of virtual addresses. This allows, for example, a map to be implemented as a tree without a predefined length. This also allows adding virtual addresses, which correspond to physical addresses of storage devices added to the plurality of remote storage devices 160. An advantage of such an exemplary embodiment may be allowing a dynamically increase to the amount of physical addresses allocated to a client device, without the need to generate a new map in its entirety each time the amount of physical addresses is increased.

The controller 100 may receive storage instructions from the client device over a first network interface. The storage instructions are for a physical storage block corresponding to a virtual address. In an exemplary embodiment the storage instructions may be 'read', 'write', 'discard', or other storage instructions. The storage instructions may be executed over a second interface. The second interface may be, for example, NVM Express. The first network interface may be a remote direct memory access (RDMA), or an Ethernet connection. RDMA may be implemented, in exemplary embodiments as iWARP, RDAM over Converged Ethernet (RoCE), and Infiniband. In certain exemplary embodiments, a logical storage block is allocated to a primary client, but is accessible by a plurality of secondary clients. The secondary clients may each have read, write, or read and write, permissions.

Figure 3:
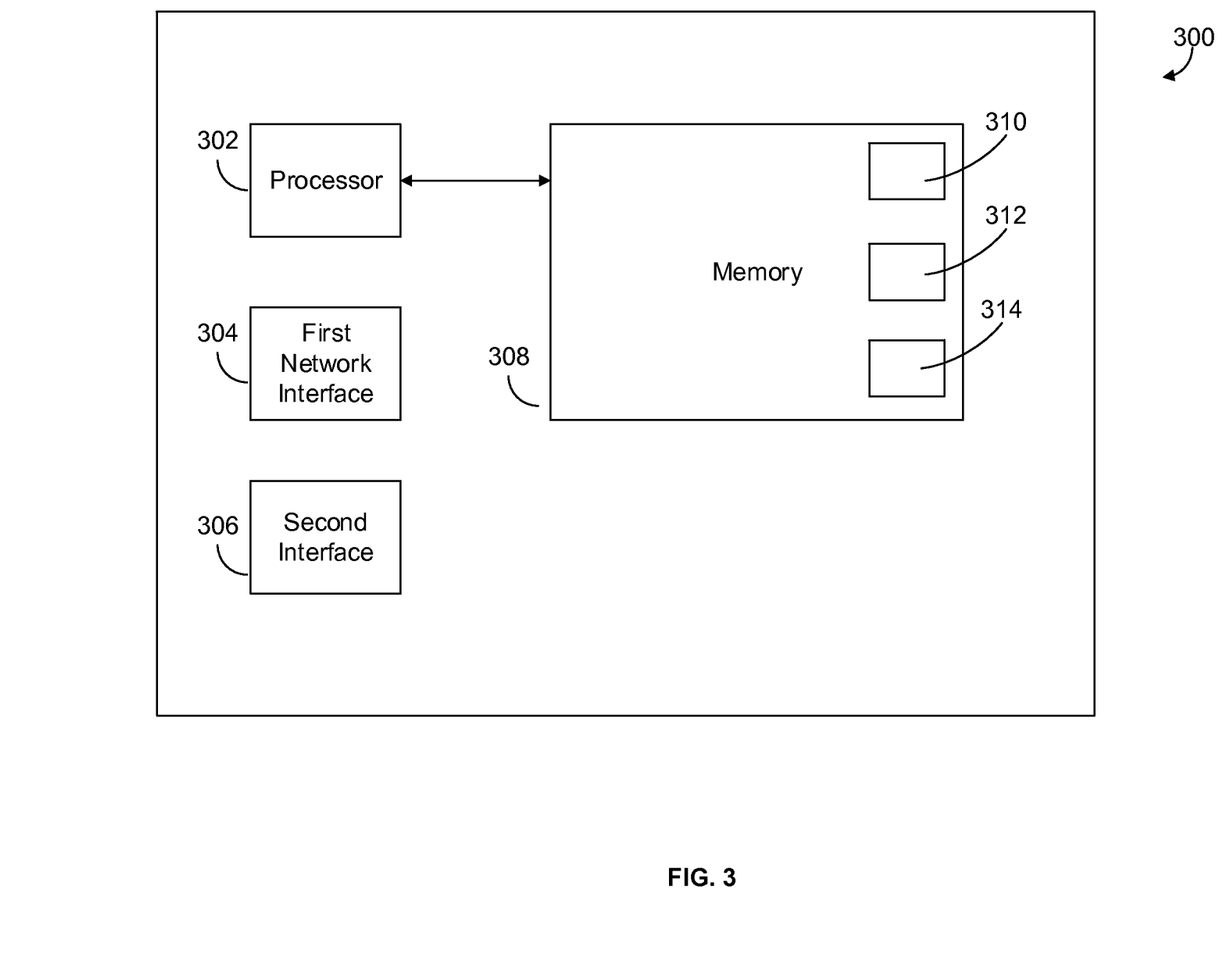
FIG. 3 is an exemplary client device.

FIG. 3 is a non-limiting exemplary schematic of a client device 300. The client device may be a personal computer (PC), a laptop, a smartphone, a smart watch, a tablet computer, and the like. The client device 300 includes a processor 302 for executing instructions, a first network interface 304 for communicating with the controller 100, a second interface 306 for communicating with the plurality of remote storage devices 160, and a memory 308 that includes a plurality of instructions 310, 312, and 314. The memory 308 is communicatively coupled with the processor 302. The processor 302 executes the instructions 310 to 314 included in the memory 308.

When the processor 302 executes the first instructions 310, the client device 300 sends, using the first network interface 304, a request for storage block mapping to the controller 100. In response to receiving the request for storage block mapping, the controller 100 sends a map to the client device 300. The map may include virtual addresses and a version number. Each of the virtual addresses corresponds to a physical address of a data block on one of the storage devices 160. The physical addresses may be on one or more of the storage devices 160.

The client device 300 uses the map received from the controller 100 and the second interface 304 to directly access a data block on the storage device 160 by mapping the virtual address to the physical address of the data block. In this way, it is possible, for example, to dynamically increase to the amount of physical addresses allocated to a client device, without the need to generate a new map in its entirety each time the amount of physical addresses is increased. This may be accomplished by having a virtual address of a first virtual block point to a second virtual block, which contains another plurality of virtual addresses. In some exemplary embodiments a map of virtual addresses and corresponding physical addresses allows adding and removing storage devices 160 transparently, by updating the map on the client device.

The second interface 304 allows access to the storage device. The second interface 304 may be, for example, NVM Express.

When the processor 302 executes the second instructions 312, the client device 300 uses the first network interface 304 to send storage instructions to the controller 100. In an exemplary embodiment, storage instructions may be 'read', 'write', 'discard', or any other storage instruction.

The first network interface may be an RDMA interface. RDMA may be implemented, in exemplary embodiments as iWARP, RDAM over Converged Ethernet (RoCE), and Infiniband.

After the client device 300 receives the map from the controller 100, the client device 300 may wish to ascertain the whether the map is current. Accordingly, when the processor 302 executes the third instructions 314, the client device 300 sends a second request for storage block mapping to the controller 100 using the first network interface 304. This second request includes a version number of the map and used to inform the controller 100 of the map currently on the client device 300. In response to receiving this second request, the controller 100 sends an updated map to the client device 300 if necessary. The controller 100 knows to send an updated map when the version of the map identified in the second request does not match the current version of the map. The controller 100 sends an updated map in order to provide the client device 300 with new virtual addresses, or new mapping of allocated virtual addresses to new physical addresses. These new virtual addresses each correspond to a physical address of a data block a storage device 160. For example, each storage device 160 includes a plurality of data blocks that each have a unique physical address. Each unique physical address has a corresponding virtual address, which is provided via the map and updated using the new map. An address of the plurality of virtual addresses may correspond to a second plurality of virtual addresses as discussed herein.

Figure 4:
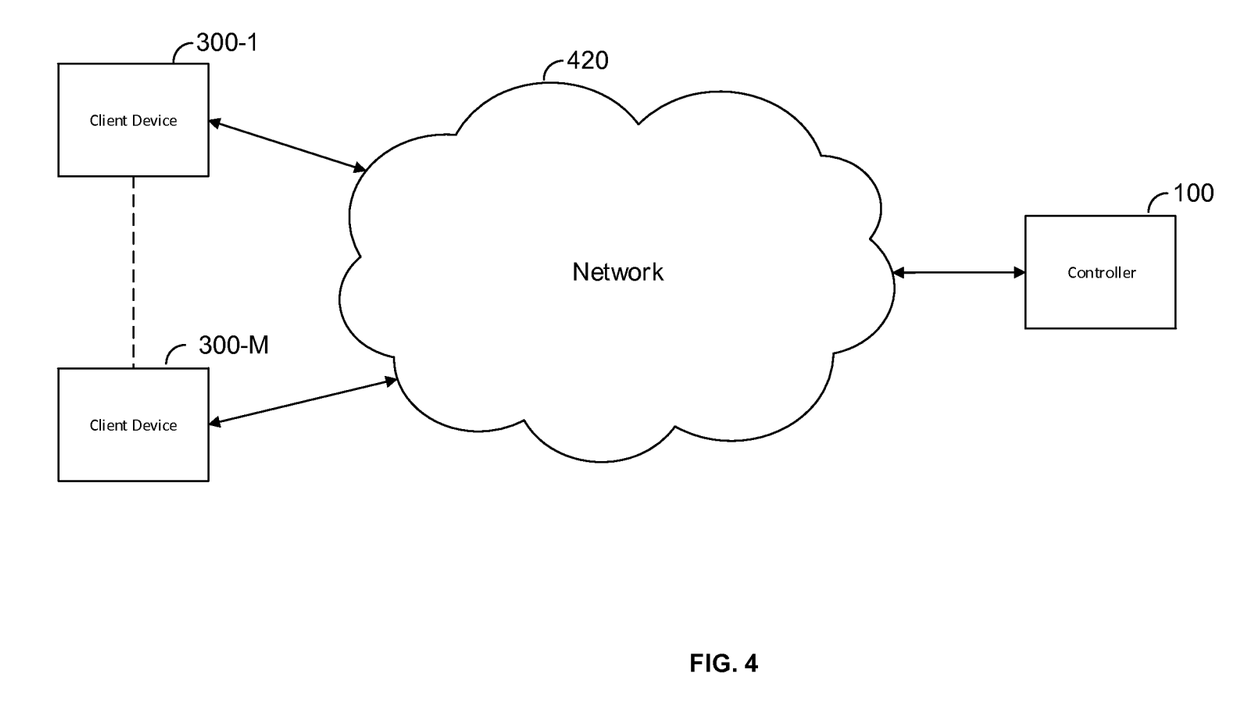
FIG. 4 is a schematic illustration of an exemplary network for clients accessing a plurality of remote storage devices.

FIG. 4 is a non-limiting exemplary schematic illustration of a network for client devices accessing a plurality of remote storage devices in accordance with an embodiment. A plurality of client devices 300-1 through 300-M are communicatively connected to a controller system 100 over a network 420. If the client devices 300-1 through 300-M are not distinguished from one another, they are simply referred to as the "client device 300" individually or the "client devices 300" collectively. The network 420 is configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity. Of course these are only examples of the various types of networks that may be used and other types of networks may be utilized without departing from the scope of the present disclosure. The controller system 100 is configured to receive requests for storage block mapping from one or more client devices 300. In some exemplary embodiments the controller system 100 performs the method described in FIG. 2. The controller system 100 has stored thereon a VBM. Upon sending a plurality of virtual addresses to a client 300, a portion of the VBM is sent to the client device 300. Each virtual address corresponds to a physical address on a remote storage device of a plurality of remote storage devices. The remote storage devices 160 are each communicatively connected to the controller system 100. 300 The portion of the VBM includes the plurality of virtual addresses sent to the client device 300. When a plurality of clients requests access to a plurality of logical storage blocks, the VBM is updated at higher rate. In some embodiments, a version of the VBM, or version corresponding to the portion thereof, is also sent to the client. In such embodiments, the controller system 100 compares the VBM version on the client and the VBM version on the controller system. If a discrepancy is found, a process for synchronizing the conflicting versions may be initialized. This is useful particularly for logical storage blocks allocated to a primary client and accessible by a plurality of secondary clients.

It should be noted that in the above description, 'N' and 'M' are each integers, each having a value of '1' or greater.

In some embodiments, the VBM has a tree data structure. In such embodiments, when the VBM is generated, it contains a single level tree root with all entries containing '0' (zero). An entry of '0' implies that nothing was allocated beyond that level. In one example, each tree node is a 4 Kilobytes (Kb) block containing 512 entries of 64 bits each. For every VBM block, there is a 64-bit lock and a 64-bit map version that holds the number of changes (e.g., write operations) to the physical block. When a read instruction is received, the VBM tree is traversed to find the mapping of the virtual address to its physical address. If the appropriate entries already exist, they can be used regardless of the map version of the VBM. Tree leaves, once they are set, are not changed. If an entry on the path does not exist, (i.e., there is a null pointer), and it was based upon a map version of the VBM stored in a client device, then it should be ensured that the version is up to date. It is typically sufficient to perform a remote read of the version and compare it to the version stored on the client device, for example by RDMA. If the version stored on the client device is not up-to-date, the block should be read normally using a standard locking protocol. The newly read copy of the block can be associated with the new version read. Once a null pointer has been validated, it can be accurately assumed that the requested block has not been provisioned yet and a '0' block can be returned.

In the example above, when a write instruction is received, the tree is traversed. When a null VBM non-leaf entry is encountered, that entry should be provisioned. To provision the entry, the VBM block is write locked, a free block allocated and zero-filled and written using the regular write-operation. The VBM block is then updated and written using the regular write-operation (the lock having already been obtained), the version updated and the VBM lock released. For a leaf VBM node, the respective VBM lock should be held throughout the write operation to ensure the physical block written is not trimmed in parallel. Upon reaching the leaf VBM node, the node is locked and its version read. If there is a cached copy with an up-to-date version, it can be used. Otherwise the VBM leaf is re-read. If the appropriate VBM leaf entry is null, a new block is allocated. The target block is written using the normal write operation. If the VBM leaf entry was null, the new VBM leaf is written and the version updated. The lock on the VBM block is then released.

The principles herein are implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as a processing unit ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and/or display unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for providing a user's client device, which is communicatively connected to a controller, access to a plurality of remote storage devices communicatively connected to the controller and to the user's client device, the method comprising:
   receiving from the user's client device, by the controller, a request for storage block mapping;
   sending a map to the user's client device, in response to the request, the map comprising a plurality of virtual addresses and a version number, each virtual address corresponding to a physical address of a data block on a storage device of the plurality of remote storage devices;
   receiving from the user's client device, by the controller, a second request for storage block mapping, the second request comprising the immediately previously sent version number of the map;
   comparing the received version number of the map to a version number of a current controller map; and
   when the received version number does not match the current version number, sending an updated map and the current version number to the user's client device, the updated map comprising a plurality of new virtual addresses, each new virtual address corresponding to a physical address of a data block on a storage device of the plurality of remote storage devices.

2. The computerized method of claim 1, further comprising receiving storage instructions from the user's client device over a remote direct memory access (RDMA) interface.

3. The computerized method of claim 2, wherein the method is performed at RDMA speed.

4. The computerized method of claim 1, wherein at least an address of the plurality of virtual addresses of at least one of the map and the updated map corresponds to a second plurality of virtual addresses such that any of the map and the updated map having an address of the second plurality of virtual addresses corresponding to a second plurality of virtual addresses is implemented as a tree without a predefined length.

5. The computerized method of claim 4, further comprising:
   initializing, in response to the received version number of the map and the version number of the controller map not matching, a process to make the received version number and the version number of the controller map match.

6. The computerized method of claim 1, wherein at least an address of the plurality of virtual addresses corresponds to a second plurality of virtual addresses.

7. The computerized method of claim 6, wherein at least a first physical address corresponding to one of the plurality of virtual addresses is on a first storage device of the plurality of remote storage devices, and at least a second physical address corresponding to one of the virtual addresses of the second plurality of virtual addresses is on a second storage device of the plurality of remote storage devices;
   whereby a physical address allocated to the user's client device can be added without a new map in its entirety being generated each time a physical address allocated to the user's device is added.

8. The computerized method of claim 1, wherein the user's client device is configured to directly access the data block by mapping the virtual address to the physical address of the data block.

9. A controller communicatively coupled to a plurality of remote storage devices and providing a user's client device access to the remote storage devices, the controller comprising:
   a processing unit;
   a first network interface configured to communicate with the user's client device;
   a second interface configured to communicate with the plurality of remote storage devices; and
   a memory containing first instructions and communicatively coupled to the processing unit,
   wherein in response to the processing unit executing the first instructions, the controller is configured to:
   receive a request for storage block mapping from the user's client device;
   send, in response to the request, a map to the user's client device, wherein the map comprises a plurality of virtual addresses and a version number, each virtual address corresponding to a physical address of a data block on a storage device of the plurality of remote storage devices;
   receive from the user's client device, a second request for storage block mapping, the second request comprising the immediately previously sent version number of the map;
   compare the received version number of the map to a version number of a current controller map; and
   when the received version number does not match the current version number, send an updated map and the current version number to the user's client device, the updated map comprising a plurality of new virtual addresses, each new virtual address corresponding to a physical address of a data block on a storage device of the plurality of remote storage devices.

10. The controller of claim 9, wherein the memory further includes second instructions, and in response to the second instructions being executed by the processing unit, the controller is further configured to: receive read/write instructions from the user's client device over a remote direct memory access (RDMA) interface.

11. The controller of claim 10, wherein the method is performed at RDMA speed.

12. The controller of claim 9, wherein at least an address of the plurality of virtual addresses corresponds to a second plurality of virtual addresses.

13. The controller of claim 12, wherein at least a first physical address corresponding to one of the plurality of virtual addresses is on a first storage device of the plurality of remote storage devices, and at least a second physical address corresponding to one of the virtual addresses of the second plurality of virtual addresses is on a second storage device of the plurality of remote storage devices;

whereby a physical address allocated to the user's client device can be added without a new map in its entirety being generated each time a physical address allocated to the user's device is added.

14. The controller of claim 9, wherein at least an address of the plurality of virtual addresses of at least one of the map and the updated map corresponds to a second plurality of virtual addresses such that any of the map and the updated map having an address of the plurality of virtual addresses corresponding to a second plurality of virtual addresses is implemented as a tree without a predefined length.

15. The controller of claim 9, wherein the user's client device is configured to directly access the data block by mapping the virtual address to the physical address of the data block.

16. A computerized method for providing a user's client device, which is communicatively connected to a controller, access to a plurality of remote storage devices communicatively connected to the controller and to the user's client device, the method comprising:

sending from the user's client device, to the controller, a request for storage block mapping;

receiving at the user's client device a map from the controller, the map comprising a plurality of virtual addresses and a version number, each virtual address corresponding to a physical address of a data block on a storage device of the plurality of remote storage devices;

directly accessing, using the user's client device, the data block by mapping the virtual address to the physical address of the data block; and sending from the user's client device, to the controller, a second request for storage block mapping, the second request comprising the version number of the map;

receiving at the user's client device an updated map from the controller when the controller determines that the version number does not match a current version number at the controller, the updated map comprising a plurality of new virtual addresses, each new virtual address corresponding to a physical address of a data block on a storage device of the plurality of remote storage devices.

17. The computerized method of claim 16, further comprising sending read/write instructions from the user's client device over a remote direct memory access (RDMA) interface.

18. The computerized method of claim 17, wherein the method is performed at RDMA speed.

19. The computerized method of claim 16, wherein at least an address of the plurality of virtual addresses corresponds to a second plurality of virtual addresses.

20. The computerized method of claim 19, wherein at least a first physical address corresponding to one of the plurality of virtual addresses is on a first storage device of the plurality of remote storage devices, and at least a second physical address corresponding to one of the virtual addresses of the second plurality of virtual addresses is on a second storage device of the plurality of remote storage devices;

whereby a physical address allocated to the user's client device by the controller can be added without a new map in its entirety being generated each time a physical address allocated to the user's device is added.

21. The computerized method of claim 16, further comprising:

wherein at least an address of the plurality of virtual addresses of at least one of the map and the updated map corresponds to a second plurality of virtual addresses such that any of the map and the updated map having an address of the plurality of virtual addresses corresponding to a second plurality of virtual addresses is implemented as a tree without a predefined length.

22. A user's client device configured to access a plurality of remote storage devices through a controller, the plurality of remote storage devices communicatively coupled to the controller, the user's client device comprising:

a processing unit;

a first network interface for communicating with the controller;

a second interface for communicating with a plurality of remote storage devices;

a memory communicatively coupled to the processing unit and containing first instructions, in response to the first instructions being executed by the processing unit, the user's client device is configured to:

send from the user's client device a request for storage block mapping to the controller;

receive at the user's client device a map from the controller, the map comprising a plurality of virtual addresses and a version number, each virtual address corresponding to a physical address of a data block on a storage device of the plurality of remote storage devices, and wherein the user's client device is configured to directly access the data block by mapping the virtual address to the physical address of the data block; and send from the user's client device, to the controller, a second request for storage block mapping, the second request comprising the version number of the map;

receive at the user's client device an updated map from the controller when the controller determines that the version number does not match a current version number at the controller, the updated map comprising a plurality of new virtual addresses, each new virtual address corresponding to a physical address of a data block on a storage device of the plurality of remote storage devices.

23. The user's client device of claim 22, wherein the memory further contains second instructions, in response to the second instructions being executed by the processing unit, the user's client device is further configured to send read/write instructions to the controller over a remote direct memory access (RDMA) interface.

24. The user's client device of claim 23, wherein the method is performed at RDMA speed.

25. The user's client device of claim 22, wherein at least an address of the plurality of virtual addresses corresponds to a second plurality of virtual addresses.

26. The user's client device of claim 25, wherein at least a first physical address corresponding to one of the plurality of virtual addresses is on a first storage device of the plurality of remote storage devices, and at least a second physical address corresponding to one of the virtual addresses of the second plurality of virtual addresses is on a second storage device of the plurality of remote storage devices;

whereby a physical address allocated to the user's client device by the controller can be added without a new map in its entirety being generated each time a physical address allocated to the user's device is added.

27. The user's client device of claim 22, wherein the memory further contains third instructions,     wherein at least an address of the plurality of virtual addresses of at least one of the map and the updated map corresponds to a second plurality of virtual addresses such that any of the map and the updated map having an address of the plurality of virtual addresses corresponding to a second plurality of virtual addresses is implemented as a tree without a predefined length.

\* \* \* \* \*